(12) United States Patent
Jang et al.

(10) Patent No.: US 11,378,471 B2
(45) Date of Patent: Jul. 5, 2022

(54) METHOD OF FABRICATING A CONDUCTIVE FABRIC, A MULTI-PRESSURE SENSOR FOR A FIBER TYPE AND A MULTI-PRESSURE MEASURING METHOD USING THE SENSOR

(71) Applicant: Korea Institute of Industrial Technology, Cheonan-si (KR)

(72) Inventors: Seong Jin Jang, Incheon (KR); Jae Hoon Ko, Ansan-si (KR); Jee Young Lim, Suwon-si (KR); Seung Ju Lim, Cheonan-si (KR)

(73) Assignee: Korea Institute of Industrial Technology, Cheonan-si (KR)

( * ) Notice: Subject to any disclaimer, the term of this patent is extended or adjusted under 35 U.S.C. 154(b) by 260 days.

(21) Appl. No.: 16/696,737

(22) Filed: Nov. 26, 2019

(65) Prior Publication Data
US 2021/0156752 A1    May 27, 2021

(51) Int. Cl.
*D06N 3/00* (2006.01)
*G01L 5/162* (2020.01)
(Continued)

(52) U.S. Cl.
CPC ............ *G01L 1/183* (2013.01); *D06N 3/0077* (2013.01); *D06N 3/0088* (2013.01); *D06M 11/28* (2013.01);
(Continued)

(58) Field of Classification Search
CPC . G06F 3/041; G06F 3/045; G01L 1/18; G01L 1/183; G01L 1/205; G01L 1/20;
(Continued)

(56) References Cited

U.S. PATENT DOCUMENTS

| | | | |
|---|---|---|---|
| 8,272,276 B2 | 9/2012 | Gorjanc et al. | |
| 2006/0269664 A1* | 11/2006 | Gleason | B05D 1/60 427/248.1 |
| 2019/0230745 A1* | 7/2019 | Andrew | H05B 3/146 |

FOREIGN PATENT DOCUMENTS

| | | | |
|---|---|---|---|
| CN | 1265438 A | * | 9/2000 |
| CN | 103642058 A | * | 3/2014 |

(Continued)

OTHER PUBLICATIONS

Chen et al. "Preparation and characterization of conductive paper via in situ polymerization of 3,4-ethylenedioxythiophene", BioResources 6(3), 3410-3423. <https://bioresources.cnr.ncsu.edu/wp-content/uploads/2016/06/BioRes_06_3_3410_1926_Chen_QA_Prep_Char_Conductive_Paper_Thiophene.pdf> (Year: 2011).*

(Continued)

*Primary Examiner* — Jonathan M Dunlap
(74) *Attorney, Agent, or Firm* — Rabin & Berdo, P.C.

(57) ABSTRACT

The invention relates to a method of fabricating a conductive fabric by vapor phase polymerization, a multi-pressure sensor for a fiber type, and a multi-pressure measuring method employing the multi-pressure sensor. The method of fabricating a conductive fabric by vapor phase polymerization provides a conductive fabric having a resistance value which changes depending on pressure applied by a user. The multi-pressure measuring method employing the multi-pressure sensor has high resistance to moisture and repeated loading, is manufactured with lower costs than existing pressure sensors, is capable of measuring both dynamic and static pressures using a principle of a piezo-resistive sensor, has a simple circuit configuration, and is strong against a high-frequency disturbance.

17 Claims, 6 Drawing Sheets

(51) Int. Cl.
  *G06F 3/041* (2006.01)
  *G01L 5/1623* (2020.01)
  *G01L 1/18* (2006.01)
  *D06M 11/28* (2006.01)
  *D06M 11/84* (2006.01)
  *D06M 13/256* (2006.01)
  *D06M 15/705* (2006.01)
  *G01L 1/20* (2006.01)
  *G01L 5/22* (2006.01)
  *D06M 15/63* (2006.01)
  *D06M 15/71* (2006.01)
  *G06F 3/045* (2006.01)
  *G01L 5/161* (2020.01)
  *G01L 5/16* (2020.01)

(52) U.S. Cl.
  CPC .......... *D06M 11/84* (2013.01); *D06M 13/256* (2013.01); *D06M 15/63* (2013.01); *D06M 15/705* (2013.01); *D06M 15/71* (2013.01); *D06M 2400/01* (2013.01); *D06N 2209/041* (2013.01); *G01L 1/18* (2013.01); *G01L 1/20* (2013.01); *G01L 1/205* (2013.01); *G01L 5/16* (2013.01); *G01L 5/161* (2013.01); *G01L 5/162* (2013.01); *G01L 5/1623* (2020.01); *G01L 5/22* (2013.01); *G01L 5/226* (2013.01); *G01L 5/228* (2013.01); *G06F 3/041* (2013.01); *G06F 3/045* (2013.01)

(58) Field of Classification Search
  CPC . G01L 5/16; G01L 5/161; G01L 5/162; G01L 5/1623; G01L 5/22; G01L 5/226; G01L 5/228; D06N 3/0077; D06N 3/0088; D06N 2209/041; D06M 2400/01; D06M 15/71; D06M 15/705; D06M 15/63; D06M 11/84; D06M 11/28; D06M 13/256
  See application file for complete search history.

(56) References Cited

FOREIGN PATENT DOCUMENTS

| | | | | |
|---|---|---|---|---|
| CN | 110207861 A | * | 9/2019 | |
| KR | 100455408 B1 | | 11/2004 | |
| KR | 1020090017527 A | | 2/2009 | |
| KR | 101846084 B1 | | 5/2018 | |
| WO | WO-2011146835 A2 | * | 11/2011 | .......... D06M 13/256 |
| WO | WO-2012121417 A1 | * | 9/2012 | .............. C08L 65/00 |
| WO | WO-2015111074 A2 | * | 7/2015 | ............ D06M 15/61 |

OTHER PUBLICATIONS

Trindade et al. "Synthesis of poly(3, 4-ethylenedioxythiophene) coating on textiles by the vapor phase polymerization method", Textile Research Journal. 2015;85(3):325-333. <https://journals.sagepub.com/doi/10.1177/0040517514545259> (Year: 2015).*

* cited by examiner

METHOD OF FABRICATING A CONDUCTIVE FABRIC, A MULTI-PRESSURE SENSOR FOR A FIBER TYPE AND A MULTI-PRESSURE MEASURING METHOD USING THE SENSOR

BACKGROUND OF THE INVENTION

Field of the Invention

The present invention relates to a fabrication method of a conductive fabric, a multi-pressure sensor for a fiber type, and a measuring method of multi-pressure, and more specifically, to a fabrication method by vapor phase polymerization of a conductive fabric having a resistance value which changes depending on pressure, and a method of manufacturing and operating a multi-pressure sensor for a fiber type which is flexible and has high resistance to moisture and repeated loading by using the fabricated conductive fabric.

Description of the Related Art

A rise in national income and development of advanced medical technology allow the home healthcare industry to be continuously expanded, and various healthcare and smart-home products such as shoes that measure a gait, a chair that measures a sitting posture, and a mattress that analyzes a sleeping pattern have been released. In addition, the low birth rate and the aging society result in an increase in single-person household, and thereby solitary deaths are also increasing. Hence, there is also a growth of a demand for an interior position tracking system for ensuring safety of the sick and the aged and the physically or mentally challenged people. Various sensors are used in such products and systems, and most principal functions are based on pressure sensors. Hence, there is also a growth of demands for the pressure sensors.

Types of pressure sensors include mechanical, electronic, and semiconductor pressure sensors, and a polymer-based semiconductor pressure sensor has higher sensitivity and higher reliability and is better in mass production than the other pressure sensors and thus is widely used. In addition, there are three types of piezo-electric, capacitive, and piezo-resistive semiconductor pressure sensors.

Of the three sensors, the piezo-electric semiconductor pressure sensor exhibits the highest performance, but is limitedly used in specific fields due to a high manufacturing cost. In addition, the capacitive pressure sensor has disadvantages of being capable of measuring only the dynamic pressure, having an intricate circuit configuration, and being vulnerable to a high-frequency disturbance. The piezo-resistive pressure sensor is capable of measuring both the dynamic and static pressures, is highly durable, and is manufactured with the lowest cost. Thus, in the healthcare and smart-home industry, the pressure sensor is often used in both a case of measuring both the dynamic and static pressures and a case of measuring a large-area pressure, and thus it is advantageous to use the piezo-resistive pressure sensor.

Recently, a demand for a pressure sensor which is attached to or integrated with a wearable device or clothes is gradually increasing; however, it is difficult to fabricate a conductive fabric by using a fabric of fibers by a simple method, and a method for measuring pressures simultaneously at several positions by using a fiber-type pressure sensor is not disclosed currently.

KR 10-2009-0017527 A discloses "CAPACITIVE NODE MEASUREMENT IN A CAPACITIVE MATRIX PRESSURE TRANSDUCER" relating to a method and system for determining a pressure distribution to a selected region, but does not disclose a configuration in which a conductive fiber fabric as a fiber-type sensor is contained as a part of a layer.

U.S. Ser. No. 08/272,276 B2 discloses "DIELECTRIC TEXTURED ELASTOMER IN A PRESSURE MAPPING SYSTEM" relating to at least one planar sheet having a surface including a plurality of sensor cells created by the intersection of electrode columns and rows and a solid elastomer dielectric separating the electrode columns and rows, but does not disclose a technology of adjusting points and the number of matrix lines and intermediate layers configured of a conductive fabric fabricated by vapor phase polymerization.

In addition, KR 10-1846084 discloses "FABRICATION METHOD OF A CONDUCTIVE FIBER" relating to a method for manufacturing a highly flexible low-resistance conductive fiber of which resistance is easily adjustable, by coating a surface of a predetermined fiber (for example, cotton fiber) with a conductive metal (for example, Pt) thin film by low-temperature atomic layer deposition (ALD) and thereby achieving low resistance, which is easily adjustable depending on a thickness of a coating film, causing even a fine fiber to be uniformly coated with a conductive thin film, and achieving the smallest sense of difference as the conductive fiber, but does not disclose a method for forming a thin film by self-assembly of gaseous monomers based on vapor phase polymerization.

KR 10-0455408 discloses "PROCESS FOR A SYNTHESIZING THIN FILM OF CONDUCTIVE POLYMERS BY GAS PHASE POLYMERIZATION AND A PRODUCT THEREOF" relating to a method by which fabrication steps are reduced to two to three steps using gas phase polymerization, thereby further reducing fabrication costs compared to a method in the related art, a good thin film property is obtained, and electrical conductivity is freely adjustable. However, it does not disclose a fabrication technology of a fiber fabric coated with conductive polymers by coating the fiber fabric with a polymer thin film and a conductive fiber fabric fabricated by the fabrication technology.

SUMMARY OF THE INVENTION

An object of the invention to solve such problems is to provide a fabrication method of a conductive fabric by vapor phase polymerization and to manufacture an optimal multi-pressure sensor for a fiber type which is suitable for a use environment by configuring a multi-pressure sensor for a fiber type which has two layers using the conductive fabric fabricated by the fabrication method and adjusting an area and the number of points.

In addition, another object of the invention is to provide a measuring method of multiple points and an operation method for using the measuring method by which it is possible to decrease a ghost phenomenon (phenomenon in which an image appears at the same column and row without applying pressure) by using the fabricated multi-pressure sensor for a fiber type.

Technical objects to be achieved by the invention are not limited to the technical objects mentioned above, and the following description enables other unmentioned technical objects to be clearly understood by a person of ordinary skill in the art to which the invention belongs.

In order to achieve the objects described above, according to an embodiment of the invention, there is provided a fabrication method of a conductive fabric by vapor phase polymerization, the fabrication method including: a) a step of immersing a fiber fabric into an oxidant solution and mangling the fiber fabric with a constant pressure such that the oxidant solution is uniformly dispersed; b) a step of placing the fiber fabric on a chemical reactor in which a monomer or a monomer solution is positioned and raising a temperature; c) a step of forming a conductive polymer by self-assembly, with molecules of the vaporized monomer coming into contact with an oxidant on the fiber fabric; d) a step of coating a surface of the fiber fabric with the conductive polymer; and e) a step of washing and drying the fiber fabric.

In addition, preferably, the oxidant solution is produced using any one oxidant selected from the group of $FeCl_3$, Fe(III), and sulfonates and any one solvent selected from the group of MeOH and EtOH, and the oxidant solution has a concentration in a range from 9% to 15%.

In addition, preferably, the monomer is EDOT and, in the step c), a reaction lasts at 60° C. for two hours.

In addition, preferably, in the step e), the fiber fabric is washed in a temperature range from 20° C. to 80° C. using 1 g/L or more of a neutral detergent in a speed range from 20 rpm to 60 rpm for 40 minutes or longer so as to have electrical safety.

Further, according to another embodiment of the invention, there is provided a multi-pressure sensor for a fiber type including: a multi-pressure sensing unit which includes two layers and to which a pressure of a user is applied; a signal processing unit that measures and transmits a change in resistance of the multi-pressure sensing unit, the resistance changing depending on the pressure; and a system unit that receives a measurement result of the signal processing unit. The multi-pressure sensing unit includes a first layer configured of a conductive fabric and a second layer configured of a conductive fabric.

In this case, preferably, the multi-pressure sensing unit includes: a plurality of first lines which can be used as electrodes; a plurality of second lines which are disposed to form a grid shape with the first lines and can be used as electrodes; pressure measuring cells which are a plurality of surfaces at which the first lines intersect the second lines; a frequency generator which is attached to the respective one side of the plurality of first lines and generates specific frequencies to the individual lines; and an AD converter which is attached to the respective one side of the plurality of individual second lines, measures voltages and frequencies of the individual second lines, converts the voltages and the frequencies into digital signals, and transmits the digital signals to the signal processing unit, in which the first layer is disposed on the second layer configured of the first lines and the second lines and allows the first lines and the second lines to be connected to each other.

In addition, preferably, the first layer is configured of a conductive fabric that is fabricated by vapor phase polymerization to have a resistance value which changes depending on a pressure of a user. Preferably, the first layer is configured of a conductive fabric that is fabricated by vapor phase polymerization to have a resistance in a range from 1 kΩ to 500 kΩ.

In addition, preferably, the second layer is configured of a conductive fabric that is fabricated by electroless plating. Preferably, the second layer is configured of a conductive fabric that is fabricated to have a resistance in a range from 0.1Ω to 50Ω.

In addition, it is preferable to include a nonconductive layer with which top surfaces or undersides of the first lines and the second lines are coated to prevent the first lines and the second lines from being in contact with each other. Preferably, the multi-pressure sensing unit has a configuration in which the multi-pressure sensing unit is cuttable at a part which is not connected to a circuit.

In addition, preferably, the multi-pressure sensing unit is formed into a structure in which the first layer and the second layer are deformable into a certain curve or curved surface shape. Preferably, the first layer and the second layer are formed into a structure in which the first and second layers are deformable to be folded in a range of an angle from −180° to 180°.

Further, according to still another embodiment of the invention, there is provided a measuring method of multi-pressure by the multi-pressure sensor for a fiber type using a conductive fabric, the measuring method including: i) a step of applying a pressure by a user to any one of pressure measuring points; ii) a step of applying, to each of the plurality of first lines, a specific frequency which is not a multiple of frequencies of the other first lines; iii) a step where a resistance value of the first layer changes at the point to which the pressure is applied by the user; iv) a step where a voltage of one of the first lines changes at the point to which the pressure is applied by the user; and v) a step of converting a voltage change of one of the second lines into a digital signal by the AD converter and transmitting the digital signal to the signal processing unit. Until the AD converter converts voltage changes of all lines of the plurality of second lines into digital signals and the digital signals are transmitted to the signal processing unit in the step v), the steps iii) to v) are repeated.

In addition, it is preferable to further include vi) a step of tracking a user position by converting a temporal domain into a frequency domain by computing a fast Fourier transform (FFT) of accumulated pressure signal data and frequency data of the signal processing unit, classifying signals for each frequency, and extracting only a signal entering a specific cell.

DETAILED DESCRIPTION OF THE PREFERRED EMBODIMENTS

Figure 1:
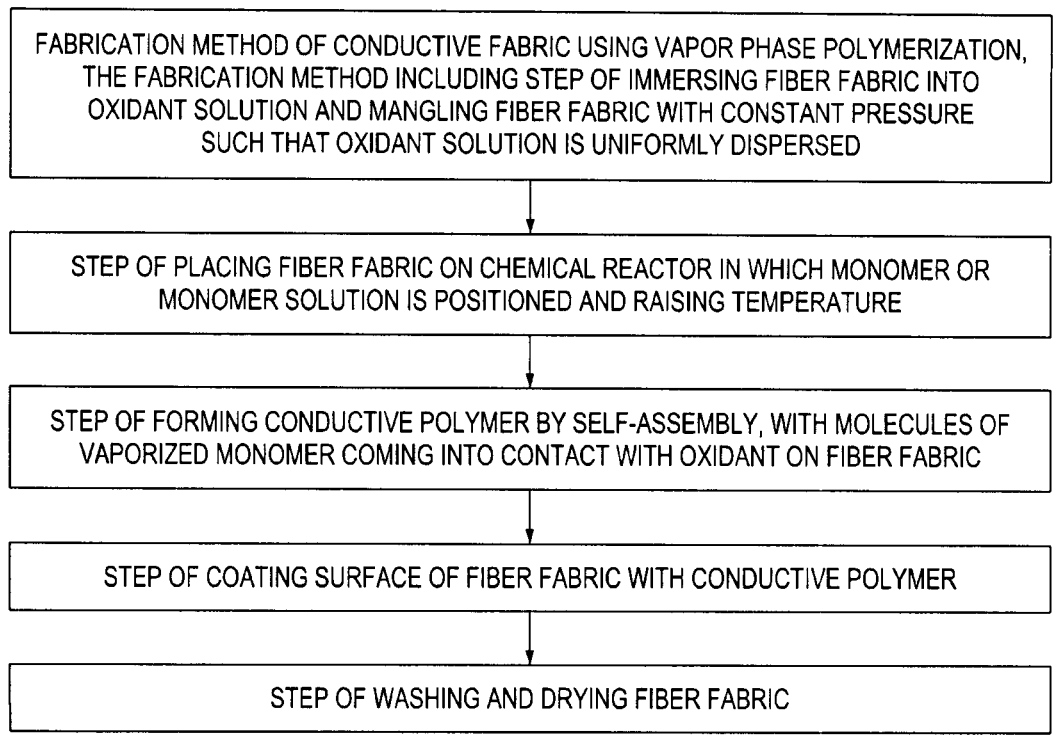
FIG. 1 is a flowchart of a fabrication method of a conductive fabric by vapor phase polymerization of the invention.

Hereinafter, the invention will be described with reference to the accompanying drawings. However, the invention can be realized as various different examples and, thus, is not limited to embodiments described here. In addition, a part irrelevant to the description is omitted from the drawings in order to clearly describe the invention, and similar reference signs are assigned to similar parts through the entire specification.

In the entire specification, a case where a certain part is "connected to (attached to, in contact with, or coupled to)" another part includes not only a case where the parts are "directly connected" to each other, but also a case where the parts are "indirectly connected" to each other with another member interposed therebetween. In addition, when a certain part "includes" a certain configurational element, this does not mean that another configurational element is excluded, but means that the configurational element can be further included, unless specifically described otherwise.

Terms used in this specification are only used to describe a specific embodiment and are not intentionally used to limit the invention thereto. A singular form includes a plural form, unless obviously implied otherwise in context. In this specification, words such as "to include" or "to have" is construed to specify that a feature, a number, a step, an operation, a configurational element, a member, or an assembly thereof described in the specification is present and not to exclude presence or a possibility of addition of one or more other features, numbers, steps, operations, configurational elements, members, or assemblies thereof in advance.

Hereinafter, the invention will be described in detail with reference to the accompanying drawings.

Textile or a textile material is used in 70% of surfaces of a bed, wall paper, an interior decorating material, a floor material, and the like with which a person comes into contact in a living environment as well as clothes, and the textile is the most general and common human interface.

Recently, there have been attempts to study combinations of the textile with various fields, and a smart textile obtained by combining a textile-based material with technologies of IT, NT, and BT has been recently developed and attracts attention as a high value-added industry.

The textile has flexibility and elasticity and is advantageous to be applied to a large surface. Hence, when the textile is used as a sensor, the sensor becomes not only free from spatial limitation, but also free from uncomfortableness of wearing so as to be very advantageous to measure and monitor biological information (electrocardiogram, breath, body temperature, movement, or the like) of a wearer.

In order to use the textile material as a pressure sensor, conductivity is first imparted to the textile material. A method for imparting the conductivity to the textile material includes a physical method and an electrochemical method of coating a textile with a conductive substance.

The electrochemical method includes an electropolymerization method, chemical vapor deposition, and vapor phase polymerization.

The electropolymerization method has a disadvantage in that a surface of a textile is coated with conductive particles by using an electrolyte electrode to form a conductive layer on the surface of the textile.

The chemical vapor deposition is a method for depositing a conductive substance on a surface and an inside of a substrate and has a disadvantage in that a high temperature at which a deposition process is performed causes a textile material to be damaged and thus it is difficult for the chemical vapor deposition to be applied to a textile.

Hence, the invention proposes a fabrication method of a conductive fabric by coating a fiber fabric with a conductive polymer thin film by vapor phase polymerization, a multi-pressure sensor for a fiber type using the conductive fabric fabricated according to the fabrication method, and a measuring method of multi-pressure.

Figure 2:
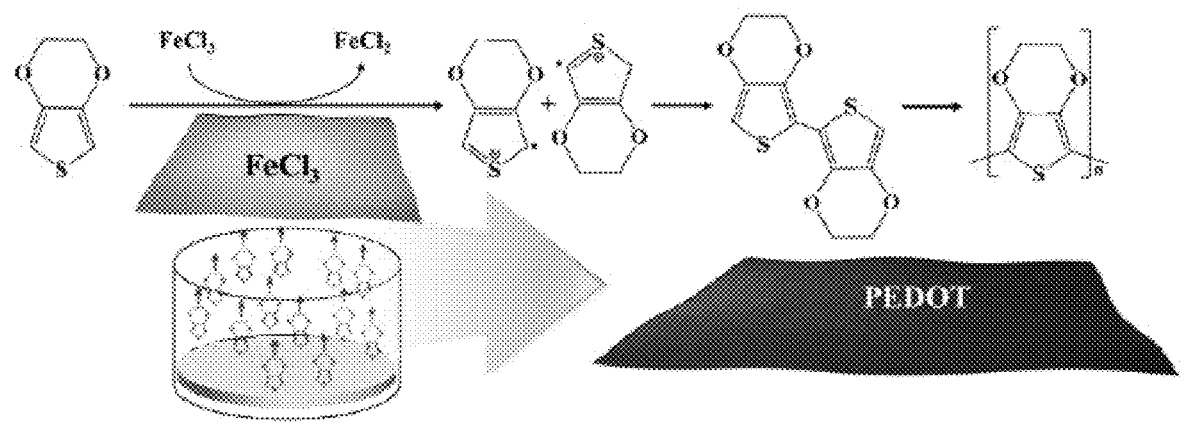
FIG. 2 is a conceptual diagram of the fabrication method of a conductive fabric by vapor phase polymerization of the invention.

FIGS. 1 and 2 illustrate the fabrication method of a conductive fabric by vapor phase polymerization according to an embodiment of the invention.

The vapor phase polymerization is a polymerization reaction by which organic monomers or gaseous monomers of organic metal come into contact with an oxidant or a reaction catalyst, become active by a redox reaction, and are polymerized through self-assembly. It is a polymerization method by which a uniform thin film is formed in a form of powder or nanoparticles and thus is very easy to impart conductivity to a fiber fabric. It is mainly used in synthesis of a polymer such as poly(3,4-ethylenedioxythiophene) (PEDOT) or polypyrrole which is widely known as a conductive polymer.

Here, since a polymerization rate of polypyrrole is relatively fast, it is difficult to control conductivity of the fabric. On the other hand, since a process speed of PEDOT is slower than that of polypyrrole, it is possible to perform relatively uniform coating, and it is easier to fabricate a conductive fiber while controlling conductivity depending on adjustment of a polymerization time.

A conductive polymer thin film by the vapor phase polymerization is formed through processes of producing an oxidant solution, immersing a substrate (fabric), mangling, vapor phase polymerization, washing and drying, and the like. A fiber fabric, to which the conductivity is to be imparted, is immersed in the oxidant solution (oxidant: FeCl3, Fe(III), sulfonates, or the like, solvent: MeOH, EtOH, or the like) and is mangled with a constant pressure such that the oxidant solution is uniformly dispersed on the fabric.

More specifically, according to an embodiment of the invention, the fabrication method of a conductive fabric by vapor phase polymerization includes: a) a step of immersing a fiber fabric into an oxidant solution and mangling the fiber fabric with a constant pressure such that the oxidant solution is uniformly dispersed; b) a step of placing the fiber fabric on a chemical reactor in which a monomer or a monomer solution is positioned and raising a temperature; c) a step of forming a conductive polymer by self-assembly, with molecules of the vaporized monomer coming into contact with an oxidant on the fiber fabric; d) a step of coating a surface of the fiber fabric with the conductive polymer; and e) a step of washing and drying the fiber fabric.

Hence, in a state where the fabric, on which the oxidant solution is uniformly dispersed, is dried or is not dried, the fabric is placed on a chemical reactor in which a monomer (EDOT, pyrrole, or the like) or a monomer solution (types of alcohols functioning as a carrier+monomer) is positioned, and the temperature is suitably raised. The molecules of the vaporized monomer come into contact with the oxidant on the fabric such that polymerization progresses by the self-assembly, and the fiber fabric coated with the conductive polymer is fabricated.

In this case, a resistance value of the conductive fabric is controlled by a type of oxidant, a concentration of the solution, a pressure of the mangling, a type of monomer, presence or absence of the carrier, the temperature and the time of the vapor phase polymerization reaction.

For example, preferably, the oxidant solution is produced using any one oxidant selected from the group of $FeCl_3$, Fe(III), and sulfonates and any one solvent selected from the group of MeOH and EtOH, and the oxidant solution has a concentration in a range from 9% to 15%.

In addition, preferably, the monomer is EDOT and, in the step c), the reaction lasts at 60° C. for two hours.

In general, a reaction temperature of the PEDOT vapor phase polymerization is known to be from 50° C. to 80° C. and, in the vapor phase polymerization according to an embodiment of the invention, the monomer of the conductive polymer is positioned in the chemical reactor, and a temperature of the fiber fabric is raised at the temperature of 60° C.

Figure 3:
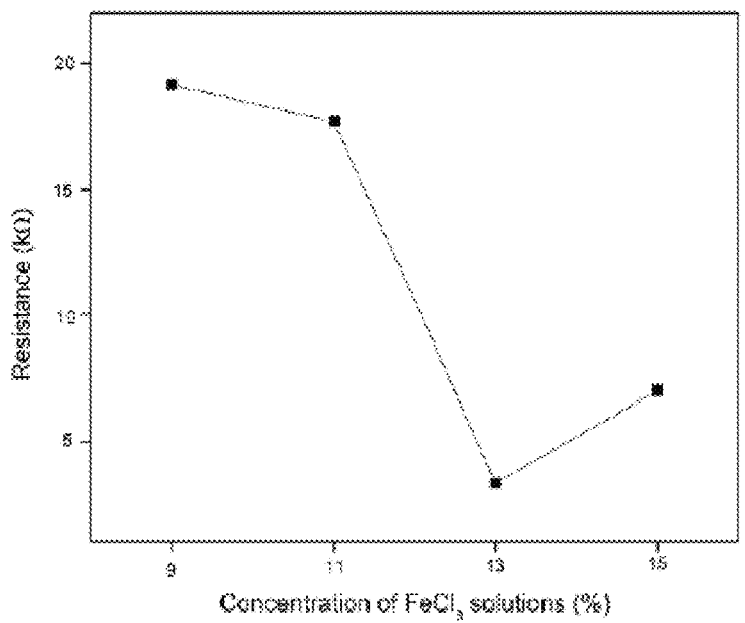
FIG. 3 is a graph illustrating a change in resistance value of a conductive fabric depending on a concentration of an oxidant solution ($FeCl_3$) according to an embodiment of the invention.

In other words, with reference to FIG. 3 illustrating a graph showing a change in resistance value of the conductive fabric depending on the concentration of the oxidant solution ($FeCl_3$) according to the embodiment of the invention, when a change in resistance value is measured by changing the concentration of $FeCl_3$ as the oxidant solution from 9% to 15%, it is possible to observe the resistance value changing by about 5 kΩ to 20 kΩ. Here, when the concentration of $FeCl_3$ as the oxidant solution is 13%, the resistance value is about 5 kΩ such that a surface resistance according to the optimal reaction condition is obtained.

Figure 4:
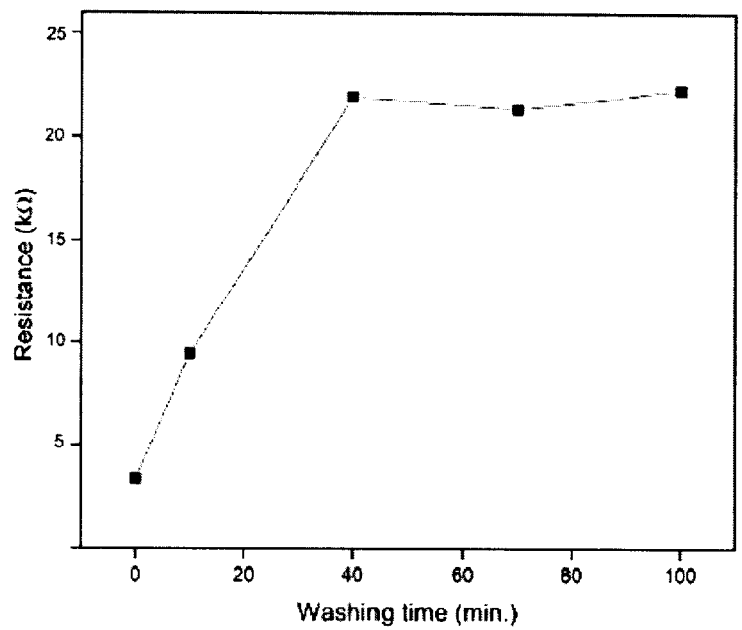
FIG. 4 is a graph illustrating a change in resistance value of the conductive fabric depending on a washing time according to the embodiment of the invention.

In addition, with reference to FIG. 4 illustrating a graph showing a change in resistance value of the conductive fabric depending on a washing time according to the embodiment of the invention, the surface resistance value changes as the washing time passes by, and it is possible to observe that a constant resistance value of about 22 kΩ is maintained after about 40 minutes. Hence, preferably, in the step e), the fiber fabric is washed in a temperature range from 20° C. to 80° C. using 1 g/L or more of a neutral detergent in a speed range from 20 rpm to 60 rpm for 40 minutes or longer more preferably 40 minutes through 100 minutes, so as to have electrical safety.

Hereinafter, an embodiment of the multi-pressure sensor for a fiber type using the fabrication method of a conductive fabric by the vapor phase polymerization according to the embodiment of the invention will be described.

Figure 5:
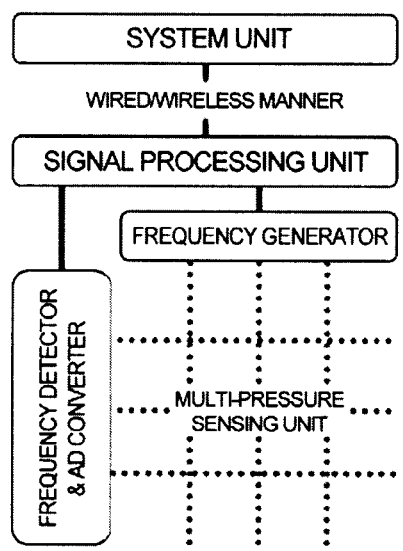
FIG. 5 is a diagram illustrating a basic configuration of a multi-pressure sensor for a fiber type using the conductive fabric of the invention.
Figure 6:
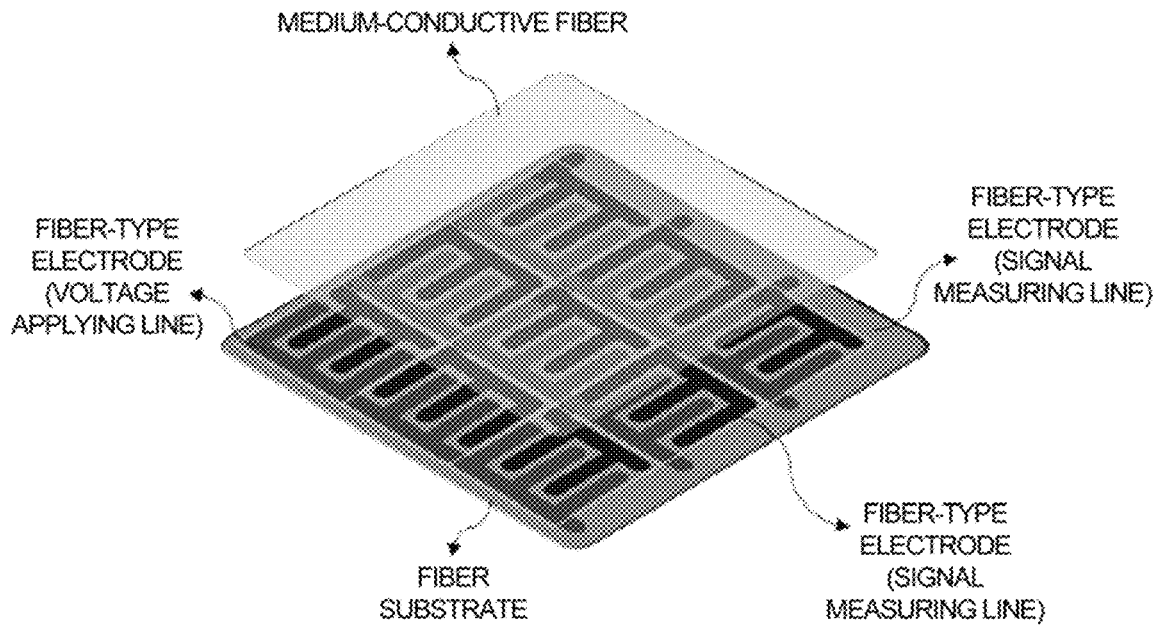
FIG. 6 is a schematic view of a multi-pressure sensing unit of the multi-pressure sensor for a fiber type using the conductive fabric of the invention.

FIG. 5 illustrates a basic configuration of a multi-pressure sensor for a fiber type using the conductive fabric of the invention, and FIGS. 6 to 9 illustrate detailed configurations of the multi-pressure sensing unit used in the multi-pressure sensor.

In other words, according to another embodiment of the invention, the multi-pressure sensor for a fiber type using the conductive fabric includes: a multi-pressure sensing unit which includes two layers and to which a pressure of a user is applied; a signal processing unit that measures a change in resistance of the multi-pressure sensing unit, the resistance changing depending on the pressure; and a system unit that receives a measurement result of the signal processing unit. The multi-pressure sensing unit includes a first layer configured of a conductive fabric and a second layer configured of a conductive fabric.

In this case, preferably, the multi-pressure sensing unit includes: a plurality of first lines which can be used as electrodes; a plurality of second lines which are disposed to form a grid shape with the first lines and can be used as electrodes; pressure measuring cells which are a plurality of surfaces at which the first lines intersect the second lines; a frequency generator which is attached to the respective one side of the plurality of first lines and generates specific frequencies to the individual lines; and an AD converter which is attached to the respective one side of the plurality of second lines, measures voltages and frequencies of the individual second lines, converts the voltages and the frequencies into digital signals, and transmits the digital signals to the signal processing unit, in which the first layer is disposed on the second layer configured of the first lines and the second lines and allows the first lines and the second lines to be connected to each other.

Figure 7:
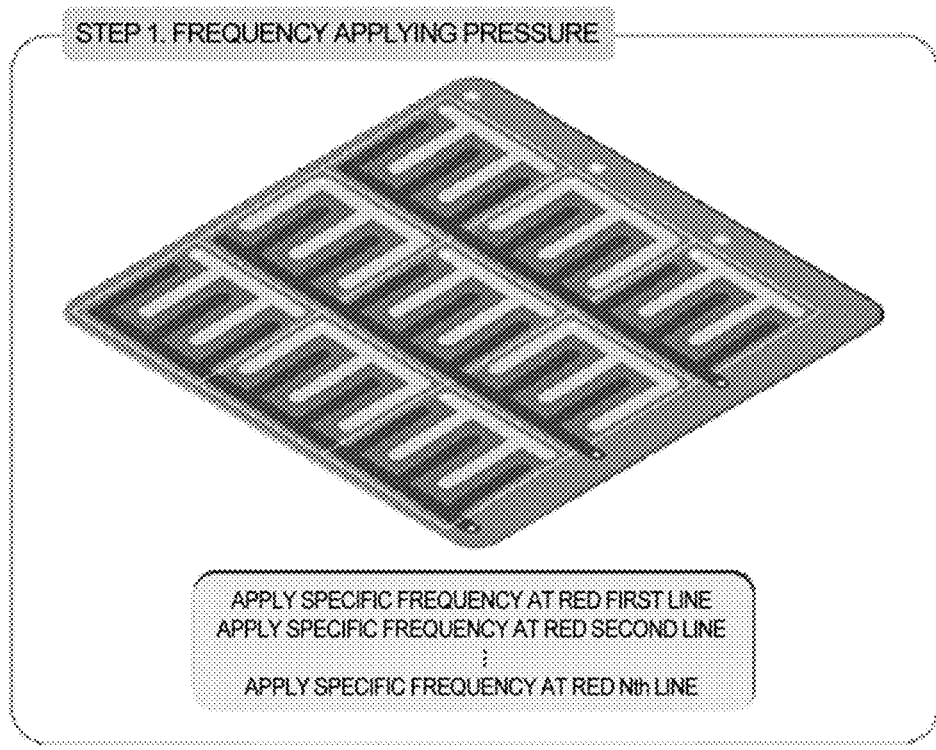
FIGS. 7 and 8 are schematic views illustrating application of a frequency and method for measuring a signal at the multi-pressure sensing unit of the multi-pressure sensor for a fiber type using the conductive fabric of the invention.

In other words, the first lines are voltage applying lines and can apply voltage by applying the specific frequencies to the respective first lines, and the specific frequencies are applied to the respective lines disposed in parallel with each other, and thereby the voltage is transmitted (refer to FIG. 7).

Figure 8:
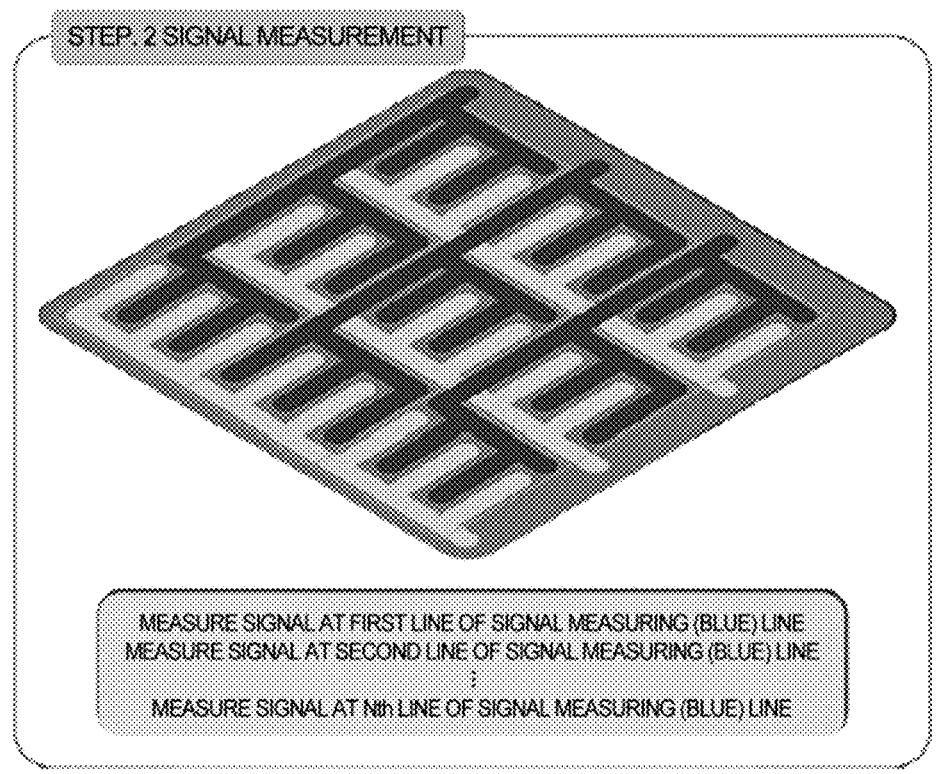

In addition, the second lines are lines for measuring a signal, and it is possible to measure the signal at the individual second lines (refer to FIG. 8).

In this case, a direction in which the plurality of first lines are disposed and a direction in which the plurality of second lines are disposed are to be orthogonal to each other, and thus one of the second lines is disposed to pass over the plurality of first lines.

Figure 9:
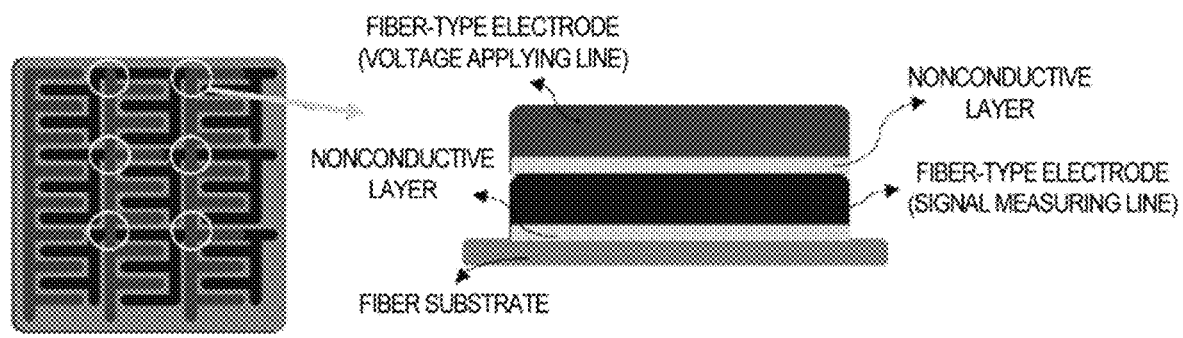
FIG. 9 is a schematic view illustrating a method for joining nonconductive layers used in the multi-pressure sensing unit of the multi-pressure sensor for a fiber type using the conductive fabric of the invention.

With reference to FIG. 9, a plurality of points at which the plurality of first lines intersect the plurality of second lines become pressure measuring points. The number of pressure measuring points can be determined depending on the number of first lines and second lines, and it is possible to adjust the number of first lines and second lines and an area of the pressure measuring point for measuring the pressure depending on an environment in which the multi-pressure sensor is used.

In other words, in a case of a user position tracking floor of which a low resolution on a large area is required, the embodiment of the invention can have a configuration in which the pressure measuring point having widths of the first line and the second line has an area in a range of 15 $cm^2$ to 30 $cm^2$. On the other hand, in a case of a body pressure analyzing matrix of which a high resolution on a small area is required, the embodiment of the invention can have a configuration in which the pressure measuring point having widths of the first line and the second line has an area in a range of 1 $cm^2$ to 5 $cm^2$.

In addition, more preferably, the multi-pressure sensing unit has a configuration in which the multi-pressure sensing unit is cuttable at a part which is not connected to a circuit such that it is possible to freely form a shape depending on a use environment.

In addition, it is preferable to further include a nonconductive layer with which top surfaces or undersides of the first lines and the second lines are coated to prevent the first lines and the second lines from being in contact with each other. In FIG. 9, a separate nonconductive layer is inserted between the first and second lines to prevent mutual interference therebetween in advance.

In this case, preferably, the first layer is configured of a conductive fabric that is fabricated by vapor phase polymerization to have a resistance value which changes depending on a pressure of a user. Preferably, the first layer is configured of a conductive fabric that is fabricated by vapor phase polymerization to have a resistance in a range from 1 kΩ to 500 kΩ.

In addition, preferably, the second layer is configured of a conductive fabric that is fabricated by electroless plating. Preferably, the second layer is configured of a conductive fabric that is fabricated to have a resistance in a range from 0.1Ω to 50Ω.

In addition, preferably, the multi-pressure sensing unit is formed into a structure in which the first layer and the second layer are deformable into a certain curve or curved surface shape. Preferably, the first layer and the second layer are formed into a structure in which the first and second layers are deformable to be folded in a range of an angle from −180° to 180°.

Hereinafter, the measuring method of multi-pressure of the multi-pressure sensor for a fiber type of the invention will be described.

The measuring method of multi-pressure by the multi-pressure sensor for a fiber type using a conductive fabric includes: i) a step of applying a pressure by a user to any one of pressure measuring points; ii) a step of applying, to each of the plurality of first lines, a specific frequency which is not a multiple of frequencies of the other first lines; iii) a step where a resistance value of the first layer changes at the point to which the pressure is applied by the user; iv) a step where a voltage of one of the first lines changes at the point to which the pressure is applied by the user changes; and v) a step of converting a voltage change of one of the second lines into a digital signal by the AD converter and transmitting the digital signal to the signal processing unit. Until the AD converter converts voltage changes of all lines of the plurality of second lines into digital signals and the digital signals are transmitted to the signal processing unit in the step v), the steps iii) to v) are repeated.

The signal processing unit can track a user position and intensity of pressure by measuring a signal with the principle as illustrated in FIG. 9 and using an accumulated data value and a frequency component so as to be communicable with a healthcare and smart-home system in a wired/wireless manner.

In other words, the voltage value and a frequency is measured by applying a specific frequency to the voltage applying line, which is the first line, and using the AD converter (analog to digital converter) that is connected to a signal measuring line, which is the second line, and the voltage value and the frequency are converted into a pressure value and coordinate.

Hence, when the specific frequencies are applied to the voltage applying lines, which are the first lines, and signals measured at the signal measuring lines, which are the second lines, are separated for each frequency, it is possible to perform measurement as much as the number of voltage applying lines by one measurement at the signal measuring line. Here, when the number of signal measuring lines is N, and 100 μs is consumed for one ADC, 100 μs×N is consumed to measure pressures at all of the points. In this case, the number of voltage applying lines is irrelevant thereto. It is needless to say that it is possible to measure at a faster speed because a speed of ADC depends on a circuit.

In addition, it is preferable to further include vi) a step of tracking a user position by converting a temporal domain into a frequency domain by computing a fast Fourier transform (FFT) of accumulated pressure signal data and frequency data of the signal processing unit, classifying signals for each frequency, and extracting only a signal entering a specific cell.

Figure 10:
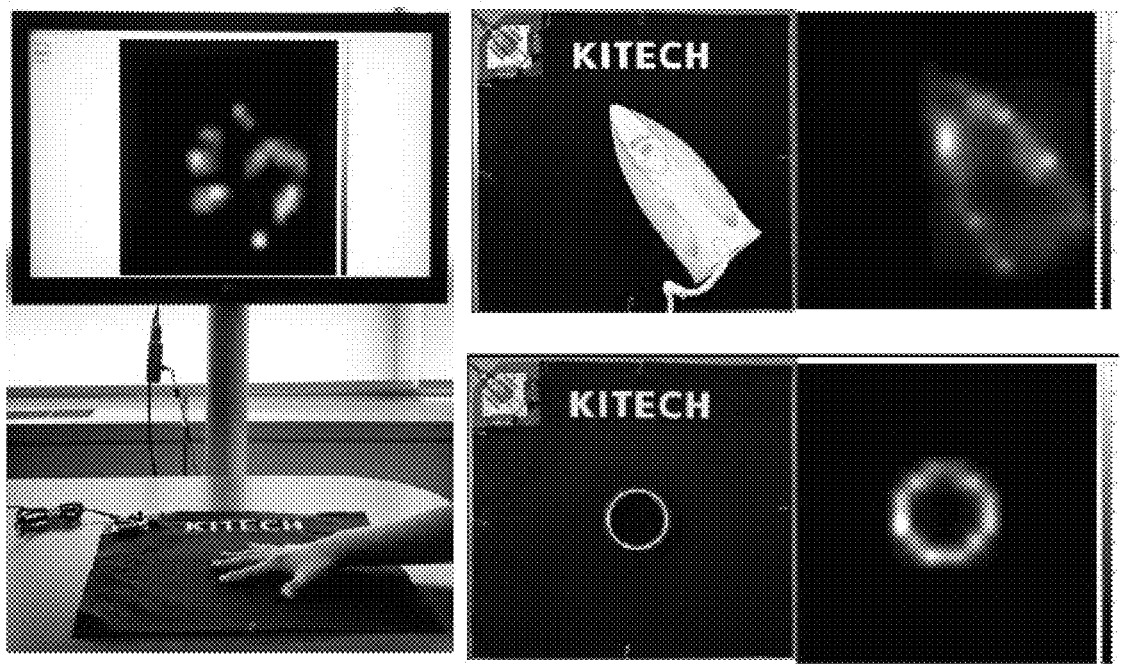
FIG. 10 is a view illustrating an example of measuring pressures having various shapes using the multi-pressure sensor for a fiber type using the conductive fabric of the invention.
Figure 11:
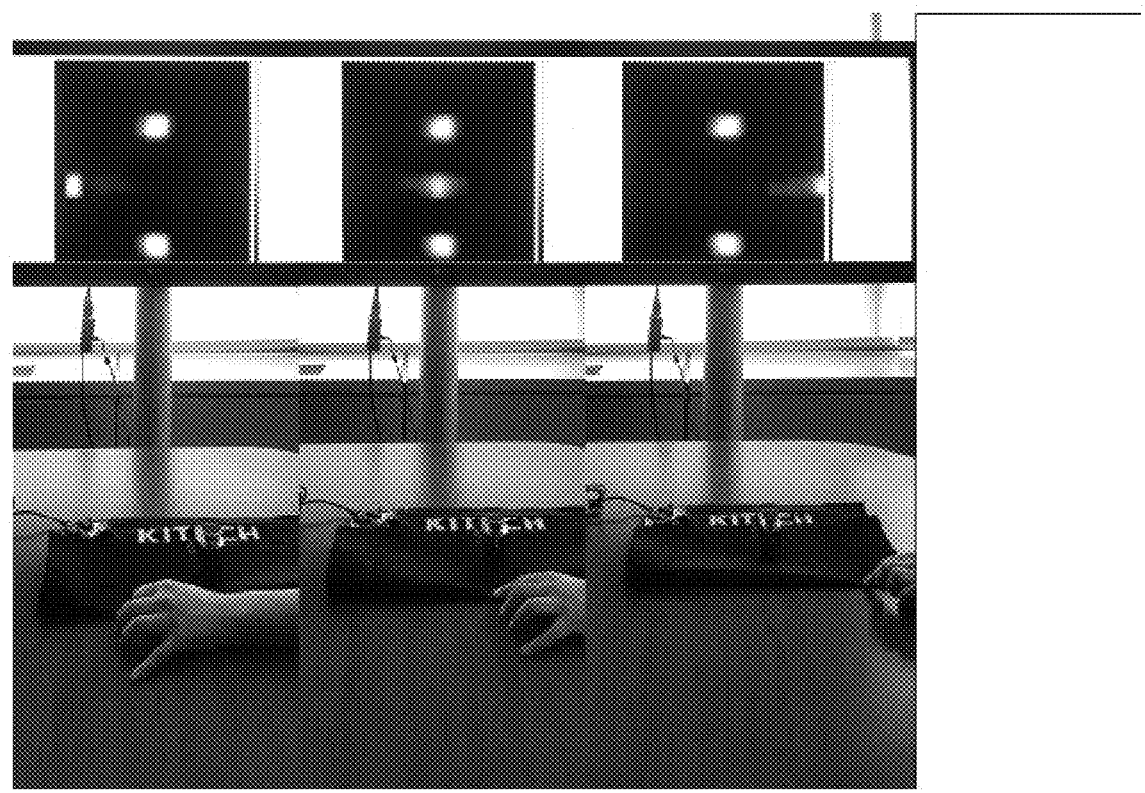
FIG. 11 is a view illustrating an example of measuring pressures in a partially folded state of the multi-pressure sensor for a fiber type using the conductive fabric of the invention.

In a multi-pressure measuring experiment of the multi-pressure sensor for a fiber type of the invention illustrated in FIGS. 10 and 11, Teensy 3.2 MCU manufactured by PJRC is used as a controller of the signal processing unit, and a 10 Hz sampling rate and 16-bit ADC is used by the AD converter.

In addition, since a pressure change due to a touch by a human body does not generally occur faster than 100 MS, when the single pressure measuring point is measured sequentially very fast, it is possible to measure multiple pressures applied simultaneously, and according to the multi-pressure sensor for a fiber type of the invention, it is possible to measure multi-pressure and the points to decrease a ghost phenomenon (phenomenon in which an image appears at the same column and row without applying pressure).

Hence, in the invention, the conductive fabric is fabricated by the vapor phase polymerization, and a multi-pressure sensor for a fiber type is manufactured by using the fabricated conductive fabric. Therefore, the multi-pressure sensor for a fiber type is advantageous to be manufactured with lower costs than an existing pressure sensor and to have good flexibility which is a characteristic of the fiber-type sensor.

The multi-pressure sensor for a fiber type is effective in that the sensor can be cuttable at any part except for a part connected to a circuit, and it is possible to manufacture a curved or curved-surface pressure sensor to organize a space.

In addition, it is possible to manufacture a pressure sensor having a high resolution by narrowing a width of the line and increasing the number of points at a position at which delicate pressure measurement is required, and it is possible to manufacture a large-area pressure sensor by increasing a width of the line at a position at which a pressure pattern of a large area needs to be measured.

According to such configurations described above, the invention has the following effects. A conductive fabric is fabricated by vapor phase polymerization, and a multi-pressure sensor for a fiber type is manufactured by using the fabricated conductive fabric. Hence, the multi-pressure sensor for a fiber type is advantageous to be manufactured with lower costs than an existing pressure sensor, to be capable of measuring both dynamic and static pressures using a principle of a piezo-resistive sensor, to have a simple circuit configuration, and to be strong against a high-frequency disturbance.

In addition, the multi-pressure sensor for a fiber type has high flexibility as a characteristic of a fiber-type sensor, easily organize space because the multi-pressure sensor for a fiber type is cuttable at any part except for a part connected to a circuit, and can be used to manufacture a pressure sensor for a curve or a curved surface.

In addition, it is possible to manufacture a pressure sensor having a high resolution by narrowing a width of the line and increasing the number of lines at a position at which delicate pressure measurement is required, and it is possible to manufacture a large-area pressure sensor by increasing a width of the line at a position at which a pressure pattern of a large area needs to be measured.

Effects of the invention are construed not to be limited to the above-mentioned effects but to include every effect that can be derived from configurations of the invention described in the detailed description of the preferred embodiments and claims of the invention.

The description of the invention above is provided as an example, and a person of ordinary skill in the art to which the invention belongs can understand that it is possible to easily modify the invention to another embodiment without altering the technical idea or essential feature of the invention. Therefore, the embodiments described above need to be understood as exemplified examples in every aspect and not as examples limiting the invention. For example, the configurational elements described in singular forms can be realized in a distributed manner. Similarly, the configurational elements described in a distributed manner may be realized in a combined manner.

The scope of the invention needs to be construed by the claims below, and meaning and the scope of the claims and every modified or altered embodiment derived from an equivalent concept of the claims need to be construed to belong to the scope of the invention.

What is claimed is:

1. A method of fabricating a conductive fabric employing vapor phase polymerization, comprising the following steps in the order recited:
    immersing a fiber fabric into an oxidant solution containing an oxidant and mangling the fiber fabric with a constant pressure such that the oxidant solution is uniformly dispersed and the oxidant is present on the fiber fabric;
    placing the fiber fabric on a chemical reactor in which a monomer or a monomer solution is positioned and raising temperature of the monomer solution to vaporize the monomer;
    forming a conductive polymer by self-assembly, with molecules of the vaporized monomer coming into contact with the oxidant present on the fiber fabric;
    coating a surface of the fiber fabric with the conductive polymer to provide a coated fiber fabric; and
    washing the coated fiber fabric at a temperature ranging from 20° C. to 80° C. using a neutral detergent in a speed range of from 20 rpm to 60 rpm provide a washed coated fiber fabric having electrical safety; and
    drying the washed coated fiber fabric.

2. The method according to claim 1, wherein the oxidant solution includes the oxidant dissolved in a solvent in which the oxidant is selected from the group consisting of $FeCl_3$, Fe(III), and sulfonates and the solvent is selected from the group consisting of MeOH and EtOH.

3. The method according to claim 1, wherein the oxidant solution has a concentration ranging from 9% to 15%.

4. The method according to claim 1, wherein the monomer is EDOT and forming a conductive polymer by self-assembly takes place at 60° C. for two hours.

5. The method according to claim 1,
    wherein, the fiber fabric is washed in a temperature range from 20° C. to 80° C. using a neutral detergent in a speed range from 20 rpm to 60 rpm for 40 minutes through 100 minutes so as to have electrical safety.

6. A multi-pressure sensor for a fiber type using a conductive fabric, the multi-pressure sensor comprising:
    a multi-pressure sensing unit which includes a first layer configured of a conductive fabric fabricated by the fabrication method according to claim 1 and a second layer configured of a conductive fabric and to which a pressure is applied by a user;
    a signal processing unit that measures and transmits a change in resistance of the multi-pressure sensing unit, the resistance changing depending on the pressure applied by the user; and
    a system unit that receives a measurement result of the signal processing unit.

7. The multi-pressure sensor according to claim 6, wherein the multi-pressure sensing unit includes:
    a plurality of first lines which can be used as electrodes;
    a plurality of second lines which are disposed to form a grid shape with the first lines and can be used as electrodes;
    pressure measuring cells which are a plurality of surfaces at which the first lines intersect the second lines;
    a frequency generator which is attached to a respective one side of the plurality of first lines and generates specific frequencies to individual lines of the plurality of first lines; and
    an AD converter which is attached to a respective one side of the plurality of second lines, which measures voltages and frequencies of individual second lines of the plurality of second lines, which converts the voltages and the frequencies into digital signals, and which transmits the digital signals to the signal processing unit, and
    wherein the first layer is disposed on the second layer configured of the plurality of first lines and the plurality of second lines and allows the plurality of first lines and the plurality of second lines to be connected to each other.

8. The multi-pressure sensor according to claim 7, further comprising a nonconductive layer with which top surfaces or undersides of the plurality of first lines and the plurality of second lines is coated to prevent the plurality of first lines and the plurality of second lines from being in contact with each other.

9. The multi-pressure sensor according to claim 6, wherein the first layer is configured of a conductive fabric that is fabricated by vapor phase polymerization to have a resistance value which changes depending on the pressure applied by the user.

10. The multi-pressure sensor according to claim 6, wherein the first layer is configured of a conductive fabric that is fabricated by vapor phase polymerization to have a resistance ranging from 1 k$\Omega$ to 500 k$\Omega$.

11. The multi-pressure sensor according to claim 6, wherein the second layer is configured of a conductive fabric that is fabricated by electroless plating.

12. The multi-pressure sensor according to claim 6, wherein the second layer is configured of a conductive fabric that is fabricated to have a resistance ranging from 0.1$\Omega$ to 50 $\Omega$.

13. The multi-pressure sensor according to claim 6, wherein the multi-pressure sensing unit has a configuration in which the multi-pressure sensing unit is cuttable at a part thereof which is not connected to a circuit.

14. The multi-pressure sensor according to claim 6, wherein the multi-pressure sensing unit is formed into a structure in which the first layer and the second layer are deformable into a predetermined curve or curved surface shape.

15. The multi-pressure sensor according to claim 14, wherein the first layer and the second layer are formed into a structure in which the first layer and the second layer are deformable and foldable at an angle ranging from −180° to 180°.

16. A multi-pressure measuring method employing the multi-pressure sensor according to claim 6, the measuring method comprising:
  i) applying a pressure by the user to at least one pressure measuring point among a plurality of pressure measuring points;
  ii) applying to each first line of the plurality of first lines a specific frequency which is not a multiple of frequencies of other first lines of the plurality of first lines;
  iii) applying pressure by the user changes a resistance value of the first layer at the point to which the pressure is applied by the user;
  iv) applying pressure by the user changes a voltage of one of the first lines of the plurality of first lines at the point to which the pressure is applied by the user; and
  v) converting a voltage change of one of the second lines of the plurality of second lines into a digital signal by the AD converter and transmitting the digital signal to the signal processing unit,
  wherein, steps iii) to v) are repeated until the AD converter converts voltage changes of all lines of the plurality of second lines into digital signals and the digital signals are transmitted to the signal processing unit.

17. The multi-pressure measuring method according to claim 16, further comprising:
  vi) tracking a user's position by converting a temporal domain into a frequency domain by computing a fast Fourier transform of accumulated pressure signal data and frequency data of the signal processing unit, classifying signals for each frequency, and extracting only a signal entering a specific cell.

* * * * *